Figure 2:
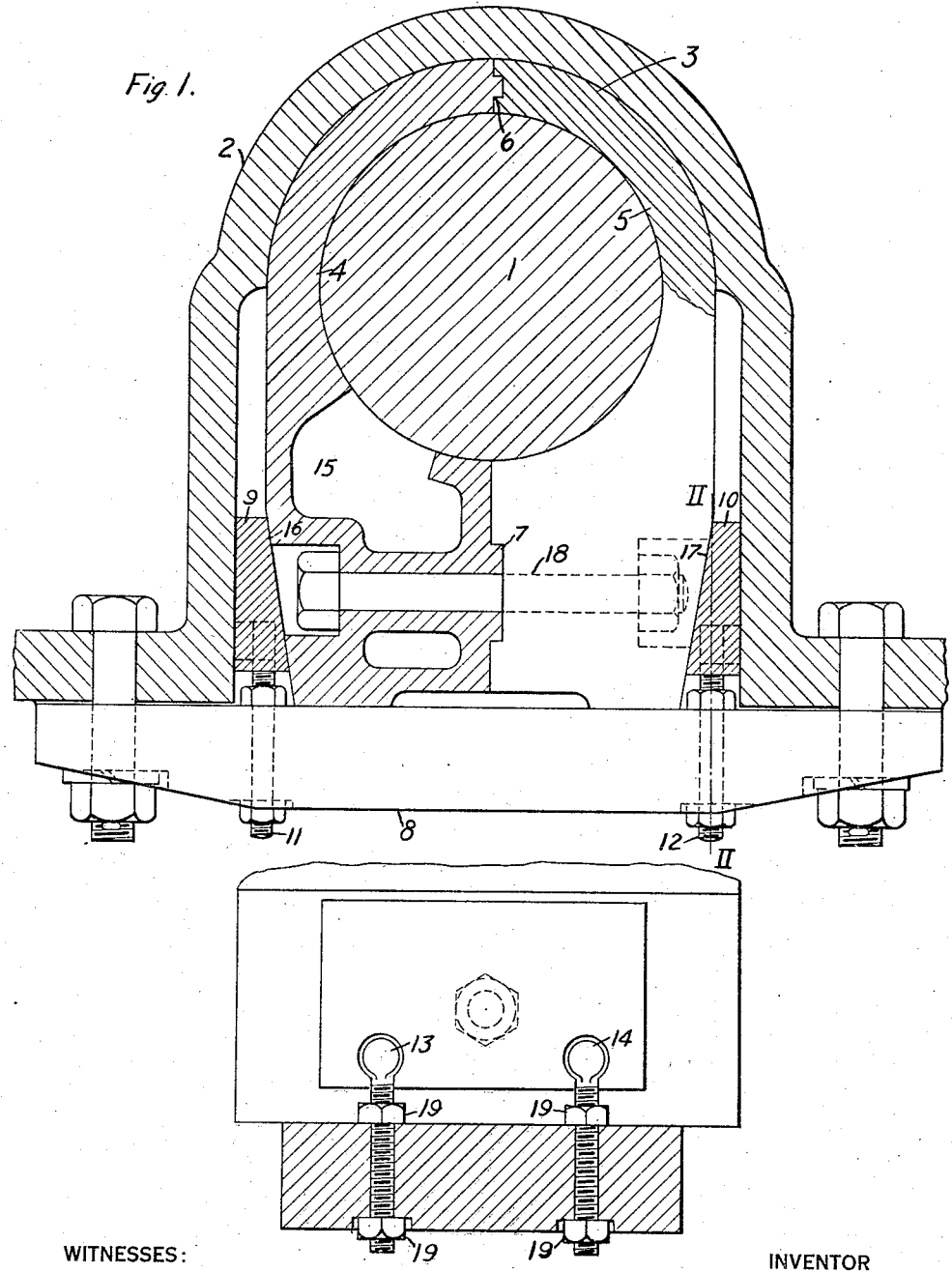

G. M. EATON.
BEARING.
APPLICATION FILED DEC. 9, 1916.

1,287,656.

Patented Dec. 17, 1918.

WITNESSES:
Ed Plinke.
W. B. Wells.

INVENTOR
George M. Eaton.
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

BEARING.

1,287,656.

Specification of Letters Patent.   Patented Dec. 17, 1918.

Application filed December 9, 1916.   Serial No. 136,020.

*To all whom it may concern:*

Be it known that I, GEORGE M. EATON, a citizen of the United States, and a resident of Pittsburgh, in the county of Allegheny and State of Pennsylvania, have invented a new and useful Improvement in Bearings, of which the following is a specification.

My invention relates to shaft bearings and particularly to bearings which are intermittently subjected to excessive lateral stresses.

One object of my invention is to provide a bearing that shall maintain the axial center line thereof unchanged and be substantially free from injurious vibrations.

Another object of my invention is to provide a bearing of the above-indicated character which shall have means for holding the bearing brasses in position against the bearing housing and for maintaining a pressure on the sides thereof which shall exceed any intermittent pressure to which the brasses may be subjected by the operation of the shaft associated therewith.

Another object of my invention is to provide a bearing of the above-indicated character which shall be provided with a bearing housing having a semi-cylindrical seat therein for receiving the bearing brasses and means for holding the brasses in said seat under pressure.

In locomotives having jack shafts disposed between the propelling motors and the driving wheels, trouble has been experienced in the past in providing bearings which would withstand the extreme intermittent stresses to which the same are subjected by reason of the loads which are transmitted thereto from the locomotive side rods. The constant hammering to which the bearings are subjected causes a lateral vibration of the bearing brasses which effects a constant rubbing action on the housing. Moreover, the cap for supporting the bearing brasses in position is subjected to the lateral vibration of the brasses in proportion to the wear that develops between the housing and the brasses and, in a very short time, the bolts which support the cap are broken.

However, in jack-shaft bearings which are constructed in accordance with my invention, the bearing brasses, when in position, are subjected to constant lateral pressures in excess of the intermittent blows which may be delivered thereon by the jack shaft, and thus prevent the vibration or chattering of the brasses.

In the accompanying drawing illustrating my invention, Figure 1 is a sectional elevation of a bearing constructed in accordance with my invention, and Fig. 2 is a sectional view taken on the line II—II of Fig. 1.

Referring to the drawing, the bearing for a jack shaft 1 embodies a housing 2 which is preferably a portion of the locomotive frame and is provided with a semi-cylindrical seat 3, bearing brasses 4 and 5 which are mounted in the semi-cylindrical seat 3 and are provided with keys and slots 6 and 7 for preventing any relative movement between the two brasses. A cap 8 is bolted to the housing 2, two wedges 9 and 10 being disposed between the brasses 4 and 5 and the housing 2, substantially below the jack shaft 1, and bolts 11 and 12, having enlarged heads 13 and 14, being provided for maintaining the wedges 9 and 10 in position.

Each of the bearing brasses 4 and 5 embodies a partial-cylindrical portion which is disposed within the semi-cylindrical seat 3 and a rectangular portion which includes a lubricating cellar 15. Inclined bearing surfaces 16 and 17 are provided for engaging the wedges 9 and 10, and bolts 18 are provided for holding the brasses securely in position relative to each other.

The enlarged heads 13 and 14 of the bolts 11 and 12 are disposed in corresponding slots in the wedges 9 and 10 and, by means of the nuts 19, the bolts 11 and 12 are adjusted to firmly place the wedges 9 and 10 in position. The pressure which the wedges 9 and 10 exert on the brasses 4 and 5, being greater than any blow which may be delivered thereon by the jack shaft, will prevent any lateral vibration of the brasses.

As the center of the semi-cylindrical seat 3 is in the axial center line of the jack shaft, the bearing brasses 4 and 5 may be given a motion of rotation to their proper angular position in the seat 3 without interfering with the axial center line of the jack shaft.

Variations in the structure and arrangement and location of parts may be made without departing from the spirit and scope of my invention, and such modifications are intended to be covered by the appended claims.

I claim as my invention:

1. In a bearing for a shaft, the combination with a housing having a semi-cylindrical seat therein, and bearing brasses having curved surfaces bearing against said seat, of means for maintaining a pressure on said brasses to prevent vibration thereof.

2. In a bearing for a shaft, the combination with a housing having a semi-cylindrical seat therein, and bearing brasses mounted in said seat, of means comprising wedges for maintaining said brasses in position and for preventing a lateral vibration thereof.

3. In a bearing for a shaft, the combination with a bearing housing, bearing brasses mounted in said housing, and means comprising wedges disposed substantially below the shaft for maintaining the brasses in position.

4. In a bearing for a shaft, the combination with a bearing housing, substantially similar, complementary bearing brasses mounted in said housing, and means for holding said brasses in position and for preventing a lateral vibration thereof.

5. In a bearing for a shaft, the combination with a bearing housing having a semi-cylindrical seat therein and brasses having curved surfaces bearing in said semi-cylindrical seat, of means disposed substantially below the axis of the shaft for rigidly maintaining the brasses in said semi-cylindrical seat and for positioning the brasses relative to the shaft.

6. In a bearing for a shaft, the combination with a bearing housing having a semi-cylindrical seat therein and brasses mounted in said seat, of means for rotating the brasses to the proper angular position in said seat and for maintaining the brasses in position.

7. In a bearing for a shaft, the combination with a housing having a semi-cylindrical seat and bearing brasses mounted in said seat, of means comprising wedges for preventing lateral vibration of the brasses and for maintaining the axial center line of the bearing unchanged.

8. In a bearing for a shaft, the combination with a bearing housing having a semi-cylindrical seat therein, and brasses having partial-cylindrical end portions mounted in said seats, of means comprising wedges for rotating the brasses to the proper angular position in said seats, said wedges being disposed substantially below the center line of the shaft.

9. In a bearing for a shaft, the combination with a housing having a semi-cylindrical seat and bearing brasses mounted in said seat, said brasses having a partial-cylindrical portion on one side of the shaft and a rectangular portion on the opposite side of the shaft, of means comprising wedges for forcing the brasses in said semi-cylindrical seat and for preventing vibration of the rectangular portions of the brasses.

In testimony whereof, I have hereunto subscribed my name this 27th day of Nov. 1916.

GEORGE M. EATON.

Copies of this patent may be obtained for five cents each, by addressing the "Commissioner of Patents, Washington, D. C."